United States Patent

Anderson

[11] 3,747,907
[45] July 24, 1973

[54] NIGHT STREAM COOLING SYSTEM AND METHOD

[76] Inventor: James H. Anderson, 1615 Hillock Ln., York, Pa. 17403

[22] Filed: June 28, 1972

[21] Appl. No.: 267,198

Related U.S. Application Data

[63] Continuation of Ser. No. 18,269, March 10, 1972, abandoned.

[52] U.S. Cl. ........... 261/128, 261/36 R, 261/119 R, 261/151, 165/45, 165/107, 62/260
[51] Int. Cl. ................................................ B01f 3/04
[58] Field of Search ................ 261/112, 151, 36 R, 261/119 R, 128; 62/260; 165/45, 106, 107; 60/95

[56] References Cited
UNITED STATES PATENTS

| 550,009 | 11/1895 | Wheeler | 165/45 |
|---|---|---|---|
| 1,233,119 | 7/1917 | Parker | 261/151 |
| 1,828,528 | 10/1931 | Fohl | 165/45 |
| 3,254,701 | 6/1966 | Thomason | 165/48 |
| 3,254,702 | 6/1966 | Thomason | 165/48 |
| 3,295,591 | 1/1967 | Thomason | 165/1 |
| 3,498,072 | 3/1970 | Stiefel | 62/118 |

Primary Examiner—Tim R. Miles
Attorney—John W. Malley et al.

[57] ABSTRACT

A cooling water storage system includes two water storage ponds, one pond being located at a higher elevation than the other. The water temperature in the lower pond is reduced by flowing the water from the high pond to the low pond during the nighttime in a manner such that a large water surface area is exposed to the atmosphere under conditions which are conducive to cooling of the water by radiation, conduction, convection and evaporation.

10 Claims, 3 Drawing Figures

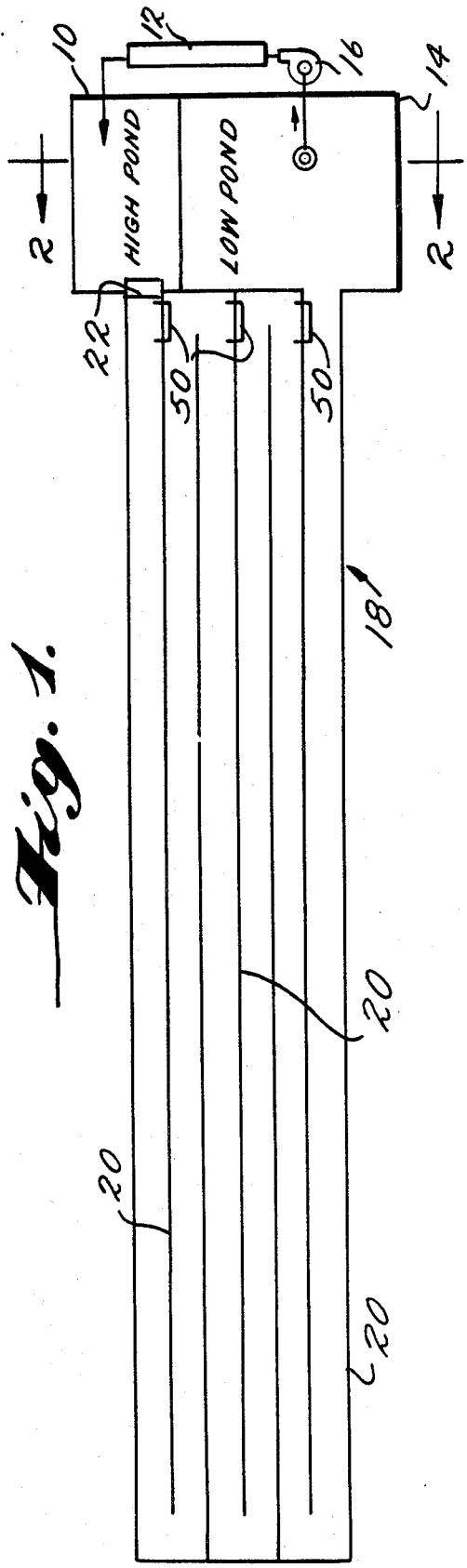
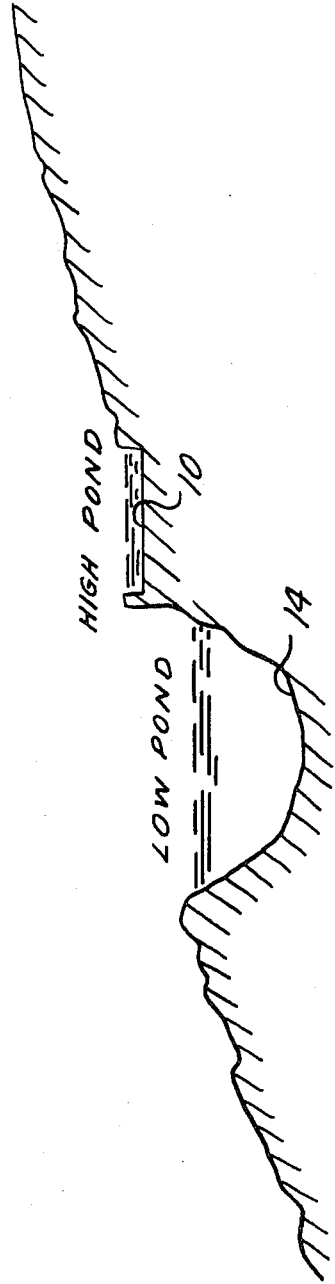

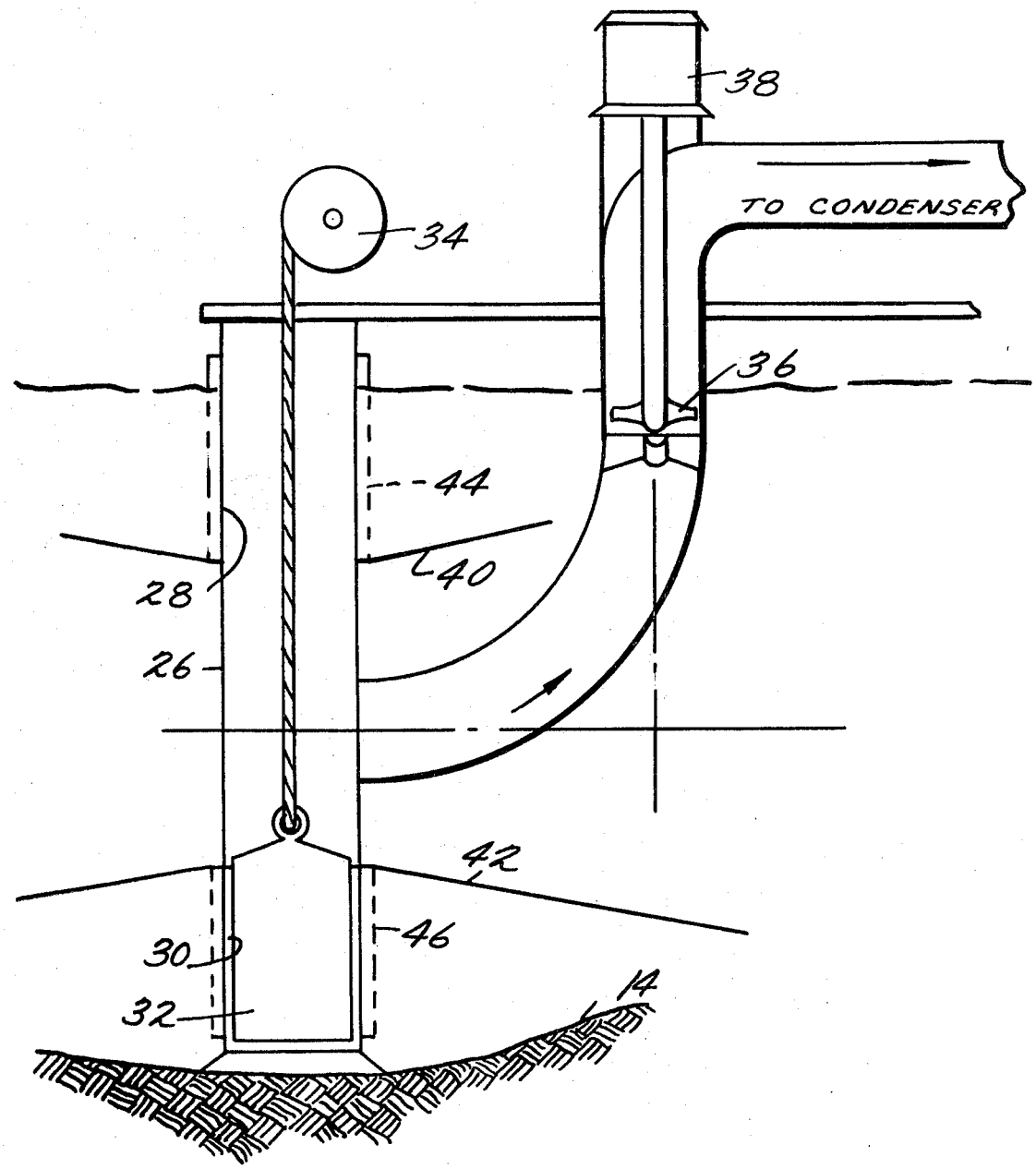

NIGHT STREAM COOLING SYSTEM AND METHOD

This is a continuation of application Ser. No. 18,269, filed Mar. 10, 1970, now abandoned.

The present invention relates to a method and apparatus for absorbing heat from a heat-producing apparatus and more particularly to a method and system of absorbing heat by cooling water and by flowing the water from a high pond to a lower pond during the nighttime in a manner such that a large water surface area is exposed to the atmosphere under conditions which are conducive to cooling of the water by radiation, conduction, convection and evaporation.

In any type of thermal power plant it is necessary to reject heat at a low temperature in order to produce power. This requires a low temperature heat sink to which heat can flow. Commonly, a river, lake, cooling tower or air cooled heat exchanger is used as a means to accept this rejection heat, and in all cases the heat must eventually be rejected to the earth's atmosphere so that the temperature is basically determined by the atmospheric temperature.

In most of the cases where a heat sink is required it is advantageous to have the temperature of the heat sink as low as possible. In the case of a power plant the theoretical effect of sink temperatures is illustrated by the familiar equation for the efficiency of the perfect or reversible cycle, as originally developed by Carnot. This is Efficiency $= (T_1 - T_2)/T_1$ Where $T_1$=absolute temperature of high temperature source of heat $T_2$=absolute temperature of heat sink.

As a specific example, if $T_1 = 1,460°R$. and $T_2 = 560°R$, corresponding to 100°F Then Eff. $= (1,460 - 560)/1460 = 0.616$ This is the maximum fraction of heat input to the plant that could be converted into mechanical energy with a perfect cycle. The remaining fraction of 0.384 must be rejected to the heat sink. If the temperature of the heat sink is reduced to 90°F or 550°R Eff. $= (1460 - 550)/1460 = .623$ or 1.1% higher because the sink temperature was lowered by 10°.

In a power plant operating from a low temperature heat source, such as hot water from an underground source, or from waste heat from a chemical process plant, the effect is much more pronounced than when a high temperature source is used.

For example, if there is provided a heat source at 200°F or 660°R and a heat sink at 100°F or 560°R Eff. $= (660 - 560)/660 = .1515$ If the sink temperature is reduced to 90°F or 550°R Eff. $= (660 - 550)/660 = .1667$ or 10% higher
In an air conditioning system, where heat is pumped from a temperature of approximately 40°F to a sink temperature of 100°F, the coefficient of performance for the thermodynamically perfect cycle is given by

C.O.P. $= T_1/(T_2 - T_1)$

Where $T_1$ = lower temperature at which heat is absorbed into the refrigeration system, $T_2$ = temperature at which heat is rejected to the heat sink. C.O.P. is the ratio of heat removed from the refrigerated space to the work input to pump this heat to the heat sink.

In the above case, C.O.P. $= 500/(560 - 500) = 8.33$ If the heat sink temperature is decreased from 100°F to 90°F then C.O.P. $= 500/(550 - 500) = 10.0$ or an improvement of 20% for a reduction in heat sink temperature of 10°.

From the above examples it can be seen that it is important to have the coldest possible water or other cooling medium available for a heat sink in either a power plant or a refrigeration system. Furthermore, in a practical operating plant the improvement in efficiency can be even greater than in the theoretically perfect cycle.

Accordingly, the general purpose of this invention is to provide for a method and system for cooling water to a much lower temperature than heretofore thought possible in general practice. By lowering the temperature of the cooling water the efficiency of a power plant or refrigeration system associated with the cooling system is improved.

An object of the present invention is the provision of a method and system for cooling water.

Another object is to provide a method and system for absorbing heat from a heat-producing process into cooling water the temperature of which is reduced by flowing the water from a high storage vessel to a lower storage vessel in a manner such that a large water surface area is exposed to the atmosphere under conditions which are conducive to cooling of the water by radiation, conduction, convection and evaporation.

Other objects and features of the invention will become apparent to those of ordinary skill in the art as the disclosure is made in the following description of a preferred embodiment of the invention as illustrated in the accompanying drawings in which:

FIG. 1 is a diagrammatic plan view of a preferred embodiment of the invention;

FIG. 2 is a section of the system taken on the line 2—2 of FIG. 1 looking in the direction of the arrows; and FIG. 3 is a section of a portion of the invention illustrating means for withdrawing a stream of cool water from the second vessel for use in extracting heat from a heat-producing apparatus.

With reference now to the drawings, wherein like reference characters designate like or corresponding parts throughout the several views, there is shown in FIGS. 1 and 2 an arrangement for using night cooling of water whereby the sun's heat and the high air temperatures of daytime are avoided so that the average temperature of the cooling water is appreciably reduced.

Consider a cooling lake or pond where almost all of the heat that is to be rejected therefrom must be rejected to the atmosphere from the water surface. If there is no heat added to the pond from the power plant or other heat source there is still continual heat flow to and from the atmosphere, and for the water temperature to remain constant the net heat flow must be zero. Heat flow between the atmosphere and the water occurs by radiation to the water surface from the sun, radiation to the water surface from the atmosphere, radiation from the water surface to the atmosphere, conduction and convection to the atmosphere from the water surface and evaporation of water from the water surface to the atmosphere. The net total of heat flow from the water surface is the algebraic sum of these variables.

Among these variables the largest heat flow is caused by the sun's radiation. This radiation tends to increase rather than decrease the temperature of the cooling water. Therefore by eliminating daytime conditions from the cooling system the average temperature of the cooling water can be very appreciably reduced.

The system of this invention which is utilized for night cooling of water includes a first storage vessel or pond 10 for receiving a stream of relatively warm cooling water which has passed in heat-exchange relationship with a heat-producing apparatus through a condenser 12 from a second storage vessel 14 and through means 16 for withdrawing a stream of cool water from the second vessel. The system further includes means 18 for enabling the flow of water from the first vessel 10 to the second vessel 14 and for simultaneously cooling the flowing water by radiation, conduction, convection and evaporation to the ambient atmosphere. This flowing means 18 includes an open-top inclined channel 20 which connects the vessels 10 and 14 and which is adapted to expose a very large surface area of the flowing water to the ambient atmosphere. The flowing means also includes a valve means 22, e.g. a bascule or other suitable type of gate, for retaining the water in the first vessel 10 during the daytime and for enabling the flow of water from the first vessel 10 into the channel 20 at night.

The second storage vessel 14 is made larger and deeper than the first or upper storage vessel 10 so as to provide for extra water storage and to permit stratification of the water at various temperatures. A depth of 30 feet, for example, is great enough to maintain the stratified temperatures which are desirable.

A more detailed view of the pump 16 is shown in FIG. 3. The arrangement of this pump is such that advantage can be taken of the stratified water temperatures. The pump includes an inlet tower 26 which has openings 28 and 30 at the top and bottom, respectively. A sleeve valve 32 is located within the inlet tower 26 and is adjustable by means of the valve lift 34 to permit suction of the propeller or other suitable type pump 36 as driven by the motor 38 to be taken from either the surface water or the bottom, as desired. In order to make sure that the water in the storage vessel is not mixed too much when it enters the inlet tower the velocity must be very low and this is accomplished by the inclusion of suction shields 40 and 42 around the tower 26 and adjacent to the top and bottom openings, respectively. In order to prevent the passage of undesirable solids through the cooling system it may be desirable to incorporate inlet screens 44 and 46 around the top and bottom inlet openings.

In the operation of the system of this invention and in the performance of the method thereof the pump 16 continually pumps water through the condenser 12 where heat is added to the water. The heated water is temporarily stored in the first or upper pond 10 during daytime operation. The bascule gate 22 is open during the night hours to permit water to flow through the long and wide channels 20 to the second or lower vessel 14. The channels 20 are relatively shallow in depth and are relatively wide, e.g. 135 feet in width, so that the width of the channels combined with the total length thereof, e.g. 28,200 feet, provides a very large total water surface area, e.g. 3,830,000 square feet or 88 acres. This large water surface area exposed to the nighttime atmosphere and without the heating effects of the sun results in marked cooling of the water as it flows from vessel 10 to vessel 14 by radiation, conduction, convection and evaporation.

Tests of the system and method of this invention have been conducted to illustrate that the average temperature to which the water is cooled is considerably higher when the system is utilized so that water flows from the upper to the lower pond for 24 hour periods as Normally, to when the system is used only during nighttime hours or for twelve hour periods. An important factor and disadvantage inherent in the method of cooling the water as described over 24 hour periods is that the highest temperature of the cooling water results when power needs are greatest in the afternoon and evening. Temperature records of actual operation of the system confirm that this is the case. The probable difference at peak load time of cooling water temperature as obtained by the night stream cooling method when compared to the continuous operation of the system is about 15°. This makes a very important difference in output capacity of a power plant when it is needed most.

The pump 16 takes water from the lower vessel continuously at a predetermined rate. The primary flow from the upper vessel through the channel 20 occurs, for example, from 6 PM to 6 AM for nighttime cooling and also occurs at a predetermined rate. From 6 AM to 6 PM, for example, a very slight amount of water may be permitted to flow through the channel 20; however, only enough water is allowed to flow during this time so that it will all be evaporated by the sun and so that none will flow into the lower vessel. The purpose of this flow is simply to prevent the channel bed temperature from rising too much from the heat of the sun during the day.

The upper vessel 10 is full by 6 PM and empties to a minimum level by 6 AM. The lower vessel 14 is made larger and deeper than the upper pond, and the purpose of this is to provide extra water storage and to permit stratification of the various layers of water at different temperatures. When the first water comes down in the late afternoon it will be fairly warm because of flowing over the warm channel bed. This water will stay on top in the lower vessel along with the water warmed by the sun during the day. Later in the night, as the water becomes quite cool, it will flow to the bottom of the lower vessel 14.

Advantage can be taken of the stratified water temperatures in the lower vessel 14 by means of the arrangement of the pump 16, as best illustrated in FIG. 3. By adjusting the sleeve valve 32 the pump suction can be taken from either the surface water or from the bottom. Normally, commercial power loads are highest in the afternoon or evening, and are very low in the hours from 1 AM to 6 AM. By using the warm surface water from the lower pond 14 during these low power load hours the coldest water at the bottom of the lower vessel 14 can be used when the power load is highest in the afternoon or evening.

In order to fill the channel 20 rapidly in the evening when the stream flow is started the bascule gate 22 can be opened enough to give more than normal stream flow. By having the sides of the channel 20 low at the end near the vessels 10 and 14, the excess flow will overflow the walls of the channel 20 thereby getting water into the lower streams much more rapidly than with a normal flow rate.

It may be advisable in many cases to be able to empty the channel 20 more rapidly in the early morning than would be possible with normal stream flow. This can be done by using very low by-pass gates 50 near the end of the channel walls as illustrated in FIG. 1. Opening these gates in the evening will also help to fill the channel 20 more rapidly. Since the water level at these by-pass gates 50 is, for example, only about 12 inches these gates can be of very light construction or can be made of inflatable rubber tubes, for example.

While the disclosure herein set forth illustrates the principles of operation of the invention, it is obvious that variations can be made, depending on experience, weather conditions, load conditions, etc. The best operating cycle must be determined by actual experience and this can be done readily by one skilled in the art. Obviously many modifications and variations of the present invention are possible in light of the above teachings. It is therefore to be understood that within the scope of the appended claims the invention may be practiced otherwise than as specifically described.

What is claimed is:

1. In the method of absorbing heat from a heat-producing apparatus into cooling water withdrawn from a body thereof the improvement which comprises: lowering the effective temperature of the water in said body of cooling water by flowing a stream of water from a storage facility under the force of gravity from a higher elevation and simultaneously effecting cooling of the flowing water by exposing the same to the ambient nighttime atmosphere to bring about heat transfer from the water to the nighttime atmosphere by radiation, conduction, convection and evaporation; storing the thus-cooled water in said body; stopping the flow of water during the daytime; and passing cooled water from said body of cooling water in heat-exchange relationship with said heat-producing apparatus as needed.

2. A method as in claim 1 including maintaining said body of cooling water at a substantial depth and selectively withdrawing water from different levels in said body for passing in heat-exchange relationship with the heat-producing apparatus.

3. A method as in claim 1 wherein said nighttime flowing step is carried out by flowing the water in the form of a continuous layer along at least one inclined channel.

4. A cooling water system comprising:
a first storage vessel for receiving a stream of relatively warm cooling water which has passed in heat-exchange relationship with a heat-producing apparatus;
a second storage vessel;
means for flowing water from the first vessel to the second vessel and for simultaneously cooling the flowing water by radiation, conduction, convection and evaporation with respect to the ambient atmosphere, said means including an open-top inclined channel located substantially at ground level and in communication with the vessels and adapted to expose a large surface area of the flowing water to the ambient atmosphere and further including valve means for retaining the water in the first vessel during the daytime and for flowing the water from the first vessel into said channel only at nighttime; and
means for withdrawing a stream of cooled water from the second vessel for use in extracting heat from the heat-producing apparatus.

5. A cooling water system as in claim 4 wherein said means for withdrawing a stream of cooled water from the second vessel includes selective valve means for withdrawing water from at least two distinct levels in the second vessel.

6. A cooling water system as in claim 5 wherein the second vessel is of greater depth and capacity than the first vessel.

7. A cooling water system for extracting heat from a heat-producing apparatus, said system comprising: a cool-water vessel for holding a supply of cooling water; a warm-water vessel; means for passing a stream of the cooling water from the cooling-water vessel into heat-exchange relationship with a heat-producing apparatus and then into said warm-water vessel; and means for flowing water from said warm-water vessel to said cool-water vessel while simultaneously cooling the flowing water by radiation, conduction, convection and evaporation with respect to the ambient atmosphere, said means including a sequence of side-by-side, open-top inclined channels in communication with each other at alternate ends so that the water flows through the channels in sequence, the upstream channel being in communication with the warm-water vessel via valve means and the downstream channel being in communication with the cool-water vessel, and said means further including by-pass valve means associated with said channels for flowing water directly from the warm-water vessel to the cool-water vessel.

8. A method for transferring heat from a heat-producing apparatus into a stream of cooling water comprising: providing a body of cooling water and a storage vessel; withdrawing a stream of water from said body, passing the stream in heat-exchange relationship with the heat-producing apparatus and discharging the stream into the storage vessel; retaining the water in the storage vessel during the daytime; and lowering the temperature of the body of cooling water by flowing a stream of water only at nighttime from the storage vessel into the body of cooling water and simultaneously cooling the stream by exposing the same to the nighttime ambient atmosphere to bring about cooling of the stream by radiation, conduction, convection and evaporation.

9. A method as in claim 8 including maintaining the coolest water in said body of cooling water below a layer of warmer water and withdrawing water from the layer of warmer water during periods of low cooling demand and from the lower, cooler water during periods of high cooling demand.

10. A method as in claim 8 wherein the stream of water which is exposed to nighttime ambient atmosphere flows as a layer over an inclined uncovered surface, said method further including the step of flowing a low-volume stream over said surface during at least a portion of the daytime so as to extract the heat absorbed by said surface from the ambient atmosphere during the daytime, and allowing said low-volume stream to evaporate on said surface so that heated water does not enter the body of cooling water.

* * * * *